Dec. 27, 1932.  W. PEYINGHAUS  1,892,628
JOURNAL BEARING
Filed June 13, 1929
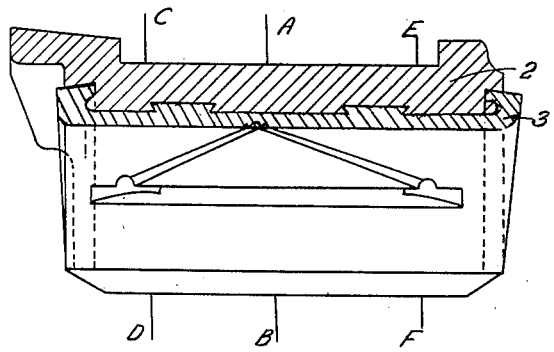
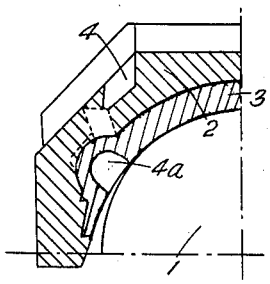 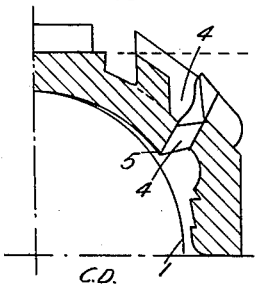 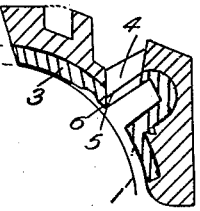
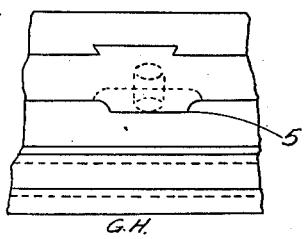

Patented Dec. 27, 1932

1,892,628

UNITED STATES PATENT OFFICE

WALTER PEYINGHAUS, OF EGGE, GERMANY

JOURNAL BEARING

Application filed June 13, 1929, Serial No. 370,711, and in Germany June 16, 1928.

The invention relates to certain new and useful improvements in journal bearings and especially to the bearings of railway car journal boxes involving drip lubrication; and has for its object to provide a composite bearing including a base, usually of bronze or other hard bearing metal, and a lining of soft bearing metal, such as Babbitt, the invention residing in providing the base with a journal bearing surface similar to that of the lining and forming in the base and the lining similar registering oil distributing openings, whereby, in case the lining melts, the journal will engage the inner surface of the base and the oil will be properly distributed to the journal through the openings in the base. The invention is illustrated in the accompanying drawing, in which:—

Fig. 1 is a longitudinal section through the bearing.

Fig. 2 is a vertical section on the line A—B of Fig. 1.

Fig. 3 is a similar section on line C—D of Fig. 1, with the lining removed.

Fig. 4 is a section on line E—F of Fig. 1.

Figure 5 is a view similar to part of Figure 1 but showing the hard base without the soft metal lining.

Referring to the drawing, 1 indicates the bearing as a whole, including a base 2 which is usually formed of cast bronze or the like so as to fit and be retained in a suitable seat in the top of the journal box, and 3 is the lining, usually of Babbitt or similar soft bearing metal, which is in engagement with the inner surface of the base 2. The inner faces of the base and the lining, in the present instance, are formed with similar contours, so that, in case the lining of soft metal is melted, the inner face of the base will serve as a bearing for the journal.

It is customary, when journal bearings of this general character are employed with drip lubrication, in which the oil is dropped from above onto the top of the base, to provide the latter and the lining with communicating channels or openings which direct the oil onto the journal. When a relatively thick lining of babbitt or the like has been employed and has been melted, due to a hot box, the lubricant will no longer be directed onto the journal, but will drip from the openings in the base to one side of the journal, with the result that, even should the journal engage the inner surface of the base, no lubrication of the engaging parts would be possible. According to the present invention, the base 2 and the lining 3 are provided with substantially similar registering oil distributing channels and openings 4 and 4a, respectively, the channels 4 in the base running substantially longitudinally of the latter and communicating with similarly disposed channels 4a in the lining 3, so that the openings of the respective channels 4 and 4a are directed substantially radially toward the axis of the bearing, whereby the lubricant will be directed onto the surface of the journal and properly lubricate the same. The channels in both the base and the lining are provided with drip edges, such as 5 and 6, to insure the proper distribution of the oil to the journal.

In the event that the lining 3 is destroyed or melted due to a hot box, the journal will engage the inner surface of the base, which will then serve as a bearing, and the oil will be properly distributed to the journal by the channels 4 in the base and the dripping edges or lips 5 of said channels, thereby insuring proper lubrication of the journal until the lining can be replaced.

What I claim is:

1. A journal bearing for drip lubrication comprising a hard metal base having its bearing surface of greater radius of curvature than the journal and a longitudinal oil groove therein which is shaped to produce drip lubrication at its upper edge, a soft metal lining having a similarly shaped groove therein, and means for supplying oil to the upper edge of the groove in the lining and to the upper edge of the groove in the base if and when the lining melts.

2. A journal bearing for drip lubrication comprising a hard metal base and a soft metal lining having similar bearing surfaces of greater radius than the journal, said base being formed with a bore which is shaped at its lower end to produce drip lubrication, said lining also being formed with a drip lubrication bore arranged in alignment with the bore in the base, a longitudinal groove in the inner surface of the base and a similar groove in the inner surface of the lining to which grooves oil can be supplied from the bores, the arrangement being such that oil normally drips from the upper edge of the groove in the lining but oil will drip on to the journal from the upper edge of the groove in the base if and when the lining melts.

In testimony whereof I affix my signature.

WALTER PEYINGHAUS.